Patented Nov. 27, 1928.

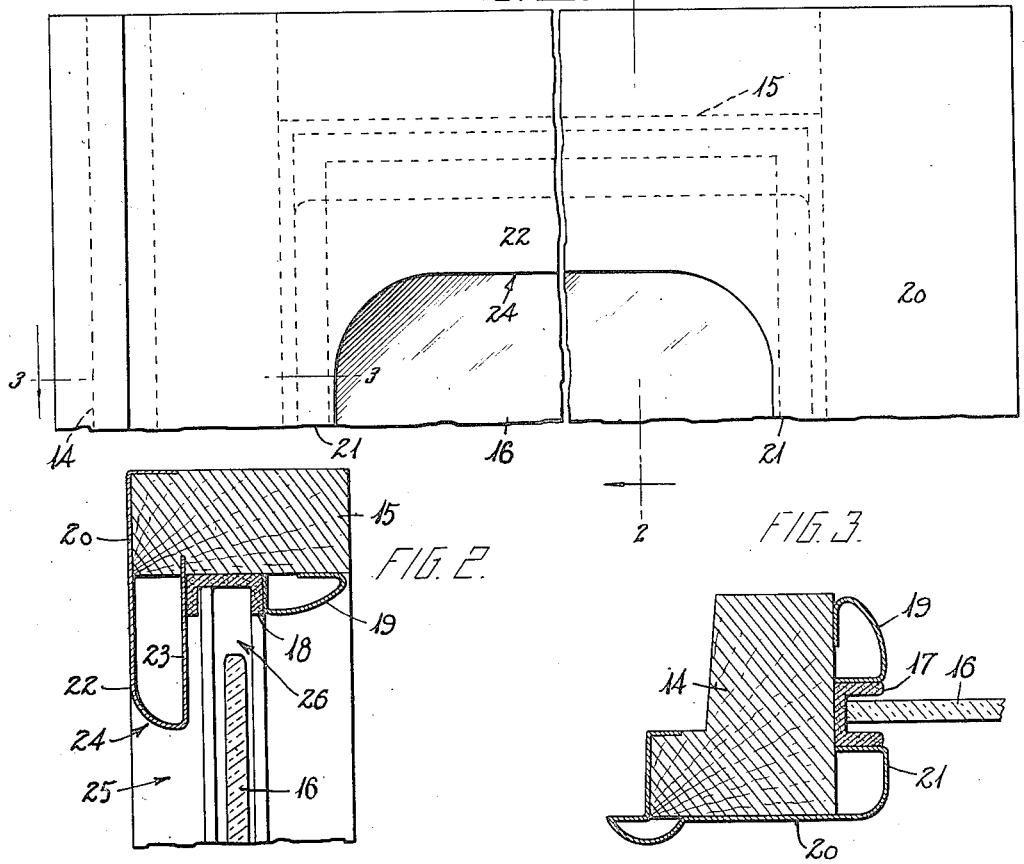

1,693,497

UNITED STATES PATENT OFFICE.

RALPH ROLLO RUSSELL AND JOHN STEPHEN WHITE, OF PADUCAH, KENTUCKY.

VENTILATING DEVICE.

Application filed June 3, 1925. Serial No. 34,700.

The present invention relates to window ventilation for closed automobiles, airships, railroad cars and other closed vehicles or conveyances, and aims to provide a novel and improved window structure permitting of ventilation over the panel, pane or glass, when same is lowered slightly, without rain, snow or sleet blowing into the vehicle or conveyance, and without permitting a strong draft through the vehicle when there are high winds.

Another object of the invention is the provision of a window construction having a depending baffle or shield therein to extend downwardly in front of the upper edge of the panel, pane or glass and permitting ventilation over said panel, a pane or glass when it is lowered slightly, without rain, snow, sleet or strong winds blowing into the vehicle.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is an outside elevation of the upper portion of a window construction, such as used in an automobile door, having the invention built therein as a permanent part thereof.

Figs. 2 and 3 are sections on the respective lines 2—2 and 3—3 of Fig. 1.

As illustrated, the improvements are embodied in the window construction of the door of a closed automobile, but it will be apparent that the improvements may also be used in the window constructions of airships, railroad cars, and other vehicles and conveyances.

The door or window frame comprises the jambs 14 and upper rail or cross bar 15 secured to the upper ends of the jambs, the frame being usually made of wood. A glass or other transparent panel, pane or plate 16 is slidable vertically within the window opening, and may be lowered for purpose of ventilation, as well known. As shown, the vertical or side edge portions of the panel 16 move in guide strips 17 of felt, rubber or other cushioning material, and a similar strip 18 is disposed up against the rail 15 to receive the upper edge of the panel when it is raised to closed position. The strips 17 bear against the jambs 14, and stop strips 19 are secured to the jambs 14 and rail 15 to hold the strips 17 and 18 in place. A sheet or plate 20 of suitable metal is secured to the outer side of the jambs 14 and rail 15, as usual, to provide the usual facing for the door or window, and the vertical edge portions thereof adjacent to the window opening are bent back inwardly, as at 21, to provide stops for holding the strips 17 in place, as seen in Fig. 3.

The structure described up to this point is well known in the art, and in carrying out the invention the sheet or plate 20 has a depending portion 22 extending for a distance below the rail 15, with a portion 23 bent back inwardly and upwardly and preferably engaging into a slot or kerf in the rail 15, as seen in Fig. 2, with the strip 18 held in place by the portion 23. The portions 22 and 23 are spaced apart, and provide a depending baffle or shield 24 which is an integral part of the window construction, so that said baffle or shield may be built into the construction during manufacture with small additional expense.

The baffle 24 is spaced from the panel 16, so that when the panel 16 is lowered slightly, as seen in Fig. 2, this will permit of ventilation over the panel and under the baffle. The baffle will exclude rain, sleet, snow and strong winds from the interior of the vehicle or conveyance, it being noted that the portion 25 of the window opening is of less height below the baffle 24 than the portion 26 of the opening in which the panel 16 moves. The panel 16 may of course be lowered further down during clear weather, but during a storm it is possible to obtain ventilation by raising the panel to bring its upper edge behind the baffle 24, without the elements entering the vehicle, and without completely closing the window so as to render the vehicle stuffy, uncomfortable and unhealthy to the occupants.

The baffle 24 is intended especially to be built in new window structures, and the depending baffle or shield depends from the upper rail of the frame and is substantially flush with the vertical plane of the outer surface of the window or door frame. The baffle, therefore, does not constitute an objectionable obstruction and does not mar the appearance of the window. The baffle is located within the normal thickness of the window frame.

Having thus described the invention, what is claimed as new is:—

In a vehicle door, a frame provided with an opening and with an upper cross member, the upper cross member having a longitudinal slot, a shield secured to the cross member and having a U-shaped member at the lower edge thereof, the free end of the U-shaped portion extending upwardly and received within the slot in the cross member, the shield including a portion which extends upwardly and over the top of the cross member, a transparent closure, means for supporting and moving said closure in spaced relation with the shield, said shield extending downwardly for a portion of the length of the opening.

In testimony whereof we hereunto affix our signatures.

RALPH ROLLO RUSSELL.
JOHN STEPHEN WHITE.